United States Patent
McClain et al.

(10) Patent No.: US 7,506,055 B2
(45) Date of Patent: Mar. 17, 2009

(54) SYSTEM AND METHOD FOR FILTERING OF WEB-BASED CONTENT STORED ON A PROXY CACHE SERVER

(75) Inventors: Carolyn B. McClain, Springville, UT (US); Jim E. Thatcher, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 10/878,782

(22) Filed: Jun. 28, 2004

(65) Prior Publication Data

US 2005/0021796 A1     Jan. 27, 2005

Related U.S. Application Data

(63) Continuation of application No. 09/560,307, filed on Apr. 27, 2000, now Pat. No. 6,772,214.

(51) Int. Cl.
*G06F 15/173* (2006.01)
(52) U.S. Cl. .................. 709/225; 709/229; 725/28; 705/12
(58) Field of Classification Search ............ 709/229, 709/217, 219, 225; 705/12; 725/28
See application file for complete search history.

(56) References Cited

U.S. PATENT DOCUMENTS

| | | | | |
|---|---|---|---|---|
| 5,678,041 A * | 10/1997 | Baker et al. | ............ | 707/9 |
| 5,826,014 A | 10/1998 | Coley et al. | ............ | 395/187.01 |
| 5,878,233 A * | 3/1999 | Schloss | ............ | 709/225 |
| 5,884,025 A | 3/1999 | Baehr et al. | ............ | 395/187.01 |
| 5,905,719 A * | 5/1999 | Arnold et al. | ............ | 370/330 |
| 5,913,025 A | 6/1999 | Higley et al. | ............ | 395/187.01 |
| 5,991,810 A | 11/1999 | Shapiro et al. | ............ | 709/229 |
| 6,081,900 A | 6/2000 | Subramaniam et al. | ............ | 713/201 |
| 6,112,228 A | 8/2000 | Earl et al. | ............ | 709/205 |
| 6,122,666 A | 9/2000 | Beurket et al. | ............ | 709/226 |
| 6,151,584 A | 11/2000 | Papierniak et al. | ............ | 705/10 |
| 6,151,601 A | 11/2000 | Papierniak et al. | ............ | 707/10 |
| 6,158,657 A * | 12/2000 | Hall et al. | ............ | 235/380 |
| 6,295,559 B1 * | 9/2001 | Emens et al. | ............ | 709/225 |
| 6,438,579 B1 | 8/2002 | Hosken | ............ | 709/203 |
| 6,493,744 B1 * | 12/2002 | Emens et al. | ............ | 709/203 |
| 6,510,458 B1 * | 1/2003 | Berstis et al. | ............ | 709/219 |

(Continued)

*Primary Examiner*—Thanh Tammy Nguyen
(74) *Attorney, Agent, or Firm*—Schwegman, Lundberg & Woessner, P.A.

(57) ABSTRACT

A system and method for filtering of web-based content in a proxy cache server environment provides a local network having a client, a directory server and a proxy cache server that caches predetermined Internet-derived web content within the network. When content is requested, it is vended to the client only if it meets predefined user policies for acceptability. These policies are implemented based upon one or more ratings lists provided by content rating vendors. The lists are downloaded to the network in whole or part, and cached for use in determining acceptability of content by a filter application. Ratings can be particularly based upon predetermined content categories. Caching occurs in a host or object cache for rapid access. Only if current ratings are not found in the host or object caches are ratings caches or vendors accessed for ratings. Ratings on requested content are then placed in the host or object cache for subsequent use. Object parsing or other techniques can be used to screen returned content that is unrated or otherwise allowed to pass to ensure that it is appropriate.

18 Claims, 12 Drawing Sheets

U.S. PATENT DOCUMENTS

| | | |
|---|---|---|
| 6,513,061 B1 | 1/2003 | Ebata et al. ............... 709/203 |
| 6,516,337 B1 * | 2/2003 | Tripp et al. ............... 709/202 |
| 6,529,526 B1 | 3/2003 | Schneidewend |
| 6,684,240 B1 * | 1/2004 | Goddard ............... 709/217 |
| 6,920,562 B1 * | 7/2005 | Kerr et al. ............... 713/189 |
| 7,043,555 B1 | 5/2006 | McClain et al. |
| 7,120,628 B1 * | 10/2006 | Conmy et al. ............... 707/4 |
| 2002/0035573 A1 | 3/2002 | Black et al. |
| 2003/0203732 A1 | 10/2003 | Eerola |
| 2004/0107177 A1 | 6/2004 | Covill et al. |

* cited by examiner

SYSTEM AND METHOD FOR FILTERING OF WEB-BASED CONTENT STORED ON A PROXY CACHE SERVER

PRIORITY

The present invention is a continuation of and claims priority to U.S. patent application Ser. No. 09/560,307, entitled: "System and Method for Filtering Web-Based Content Stored on a Proxy Cache Server," filed on Apr. 27, 2000, now issued as U.S. Pat. No. 6,772,214, which is commonly assigned to Novell, Inc. of Provo, Utah; the disclosure of which is incorporated by reference herein.

FIELD OF THE INVENTION

This invention relates to Internet content filtering and more particularly to the filtering of web content stored on a local intranet proxy cache server.

BACKGROUND OF THE INVENTION

Access by home and business computers to large, unrestricted sources of information, such as those available through the World Wide Web (the "Web") domain on the well-known Internet has increased exponentially in recent years. In many computing environments, it is desirable to restrict access to certain types of information on the Internet and other networks by selected users. For example, educational institutions and parents may wish to allow access only to educational content by access by children. Businesses may, likewise, wish to restrict content accessible over their networks, based upon legal, moral and productivity concerns. Many computers joined in Local Area Networks (LANs) frequently employ a network architecture that includes a proxy cache server to store and dispense Internet content. In a common proxy cache arrangement, a network user (a client), typically represented by a stand-alone microcomputer with an appropriate network interface, requests download of Internet web site content by entering the site's Uniform Resource Locator (URL) address into a web browser application resident on the client computer. The request is then transferred to a proxy cache server within the local network that may or may not already contain a current copy of the desired web content. If the content is present in the cache, the proxy cache server, rather than placing a call over the Internet to the remote site, instead transmits the requested web content to the client from the local network storage.

FIG. 1 illustrates a generalized architecture for a local network that includes a proxy cache server. The illustrated network is described more particularly in related U.S. patent application Ser. No. 08/905,150, entitled User Name Authentication for Gateway Clients Accessing A Proxy Cache Server. By way of background, further teachings related to a proxy cache server environment are also disclosed in U.S. patent application Ser. No. 09/023,895, entitled Client Inherited Functionally Derived From a Proxy Topology Where Each Proxy is Independently Configured; U.S. patent application Ser. No. 09/195,982, entitled Proxy Cache Cluster; and U.S. Provisional Patent Application Ser. No. 60/128,829, entitled Object Cache Store—all of which are assigned to Novell, Inc. of Provo, Utah, and the teaching of each of the aforesaid patent applications being expressly incorporated herein by reference.

Particularly, FIG. 1 illustrates an architecture-level block diagram of a local area network having a proxy cache server and associated applications. The network 20 includes a plurality of clients showing generally by the exemplary client block 22. Each client can comprise a stand-alone microcomputer having a central processing unit (CPU) 24, a memory 26 and a network adapter 28 for communication, all linked by a bus 30. Each client is linked with its own user interface 32 that allows data to be viewed and instructions to be transmitted. The user interface typically includes a keyboard, monitor and a screen-cursor manipulator, such as a mouse. The client is linked to a local network or intranet 34. Packets of data can be transferred over the intranet using the well-known Internet Protocol (IP), or Novell's improved proprietary protocol, IPX or other common protocols.

The intranet 34 is, likewise, linked with a Novell Directory Services (NDS) server 36, which operates in the commercially available Novell NetWare network operating system environment and other commercially available network operating systems. This server includes its own CPU 38, memory 40 and network adapter 42, linked by a bus 44 to the intranet 34. An associated NDS data storage device, disk 46 is also linked to the server 36. The NDS server 36 and storage device 46 store and distribute data related to client user names. Using proprietary or open standard-based data calls, the clients each poll the NDS server for the unique NDS user name. The NDS user name is used for further communication by the client once it is received over the intranet. A proxy cache server 50 is also provided, linked to the intranet by an appropriate bus. The proxy cache server also contains a CPU 52, memory 54 and network adapter 56. The proxy cache server, in this example, is linked by network link 60 to the well-known Internet communication network 62. A large number of nodes and routers enable transfer of TCP/IP formatted data packets to and from various remote sites. One such remote site consisting of a web server 64 is illustrated. The web server 64 includes its own associated data storage device such as the disk 66. In essence, the proxy cache server 50 acts as a "firewall" between the external Internet 62 and the intranet 34. Requests for web site information are first routed from clients through the intranet 34 to the proxy cache server 50. If the client is authorized to request information from a particular web site, then the information is retrieved from the memory 54 (if such information is already cached in the memory) or it is, at that time retrieved from the remote web site for transfer to the client As suggested above, it is desirable that advanced filtering techniques be employed to further ensure that the particular client can only access information from the web that is authorized. In the past this has generally entailed the physical scanning and blocking to selected web content, often on a URL-by-URL basis by the system administrator. The recent rise of independent ratings services that rate the content of a very large number of Internet sites afford an opportunity to automate the filtering function further, and to place it into the province of specialists in the field. Often, however, these services are not readily adaptable to a given network environment and employ a variety of different rating criteria and content categories. It is, therefore, an object of this invention to provide filtering that is readily adaptable to a proxy cache server environment and that enables a variety of different filtering services and databases to be employed with relative ease.

SUMMARY OF THE INVENTION

This invention overcomes the disadvantages of the prior art by providing a filter that selectively enables access or blocks requested web information by a client in a local network based upon content rating information stored in connection with a large number of known web sites. Such ratings can be stored based upon the site's URL address. When ratings are obtained, they can be applied based upon predefined user policies stored in association with the storage bank and authentication mechanism (such as NDS). Content can be stored in the local network in connection with a proxy cache server application.

The ratings can comprise a set of categories and sub-categories into which certain content falls based upon a ratings service' subjective criteria Each list is cached in whole or part in the local network in a ratings cache. The list is updated by action of either the ratings service or the filter and new lists can be transmitted over the Internet, or another network, from a remote vendor site. Each vendor may provide a software module (a NetWare Loadable Module in this embodiment) to implement the manipulation of the provided ratings list by the filter. The module may include update procedures, interpretations and translations of proprietary ratings structures and types of content rated. The filter can be configured to vend requested content, block requested content, or monitor requested content (e.g. vend content, but make log-file entry noting type of content vended and to whom). The vend/block/monitor decision is based upon a variety of criteria including override lists, always-acceptable allow lists and always blocked block page lists—typically dependent on the specific categories associated generally across all URLs, but also upon specific underlying URLs that may or may not be allowable.

A significant advantage to the system and method according to a preferred embodiment of this invention is increased speed resulting from efficient look-up of content ratings, upon which allow, block and vend-but-monitor/warn decisions are based. In the proxy server environment, content ratings are looked-up in the content host cache first. If ratings are not found in the host cache, or are inconclusive, then the object cache is checked. Then the rating cache is checked, and the rating, if found, is placed in the host or object cache for speedier look-up the next time. If a rating is not found in one of the caches, then it is sought over the Internet or another remote location from one or more rating service providers. If found, it is returned and stored for future use. Late rating service providers that scan content for key words and phrases are also used at this time to provide ratings.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 1:
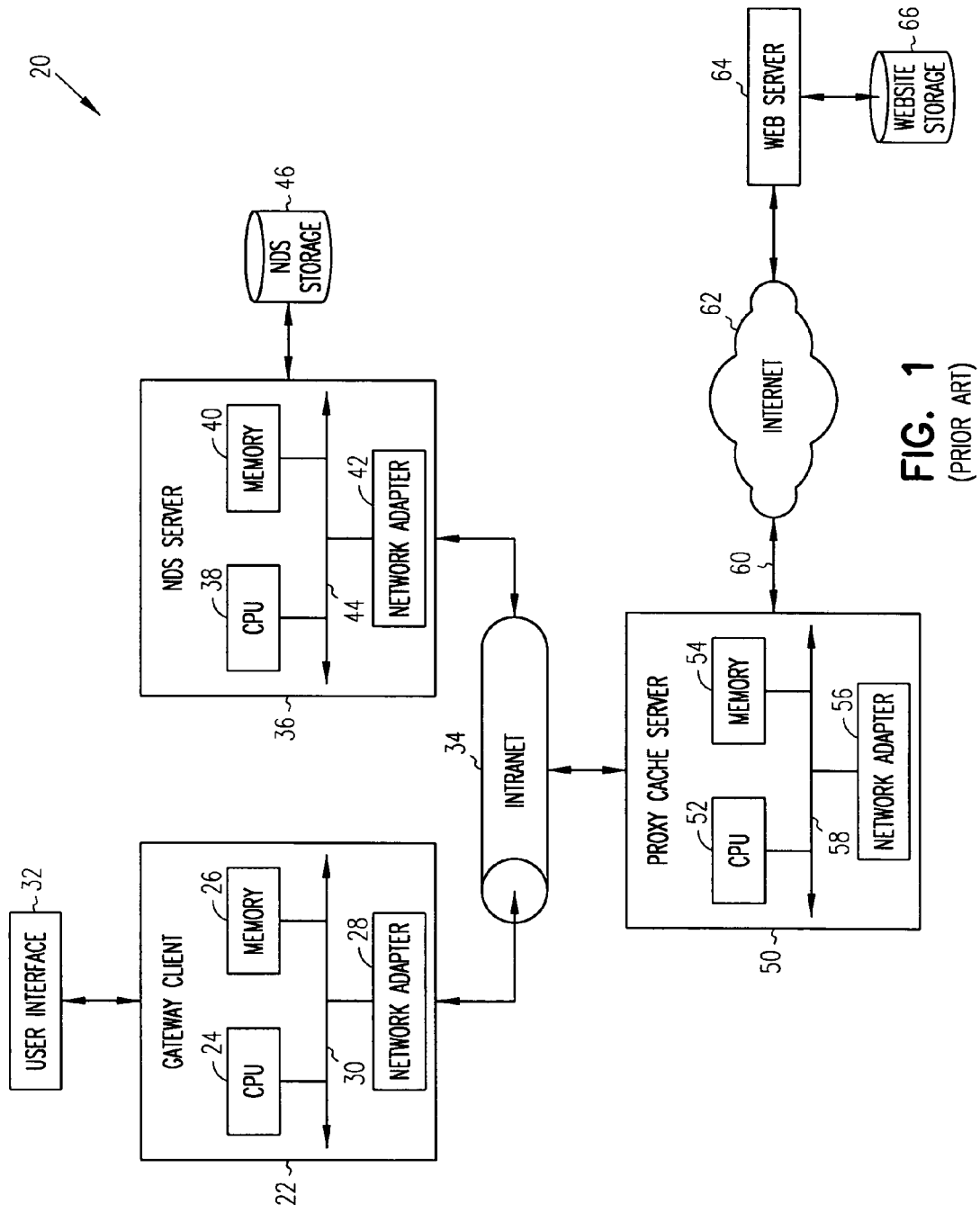
FIG. 1 is a block a diagram of a network having a proxy cache server according to the prior art.
Figure 2:
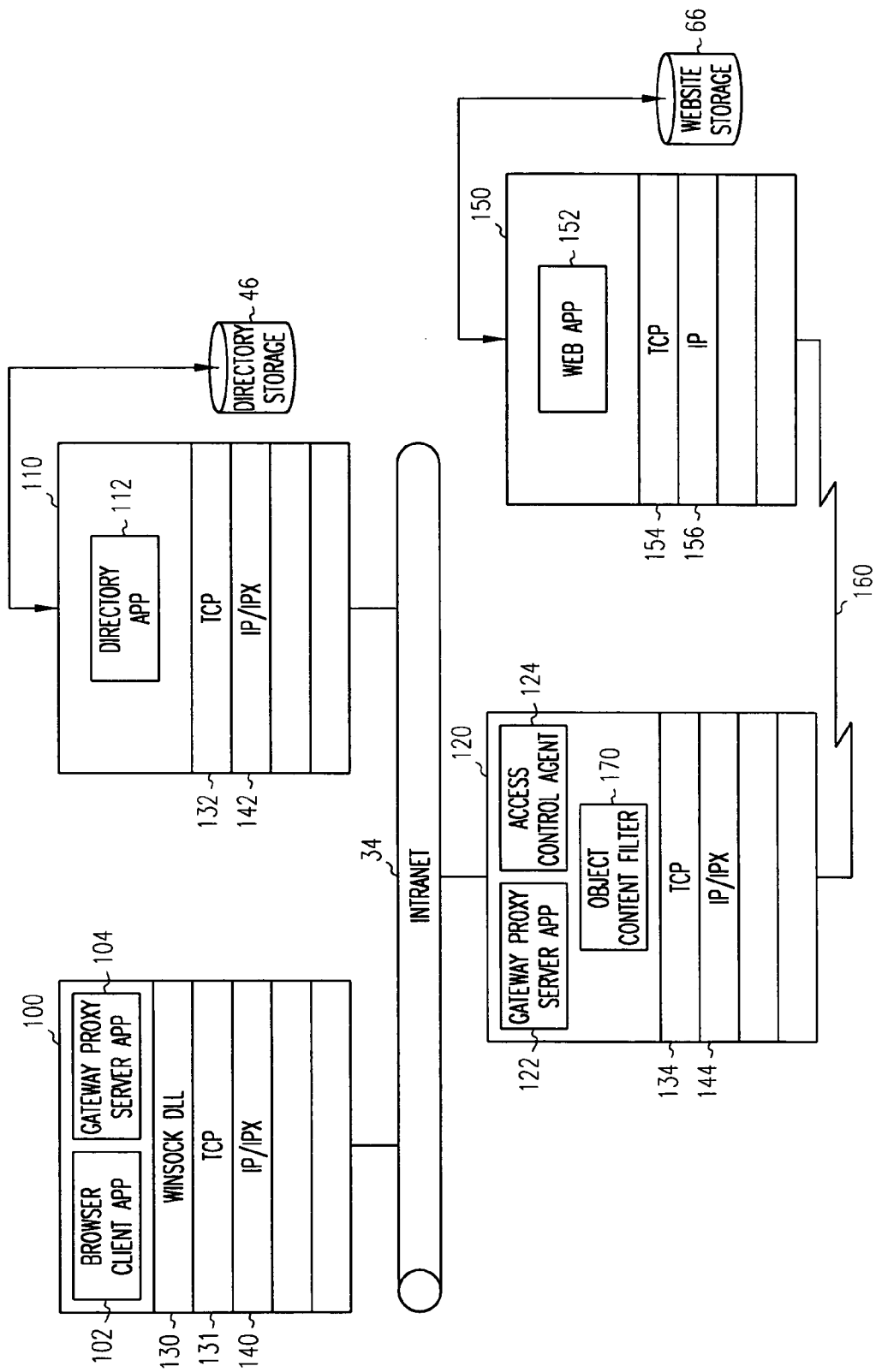
FIG. 2 is a communication-protocol level block diagram of the network of FIG. 1 including an object content filter according to this invention.

FIG. 2 shows a communication protocol stack organization for a generalized local area network that includes a proxy cache server. As noted above, the network can be configured to use the NetWare operating system or any other suitable standard. The client stack 100 includes a resident web browser application 102, such as the commercially available Netscape Navigator™ product that enables display and navigation of web site content information and a gateway client application 104. In addition, the Dynamic Link Library (DLL) resident as part of the well-known Windows® operating system Windows Socket (WinSock) available from Microsoft Corp. of Redmond, Wash. is shown. The WinSock DLL 130 generally enables communication through the intranet 34 by a client.

The authentication mechanism chosen according to this embodiment is through the lightweight directory access protocol (LDAP), but NDS, Radius and other well-known systems can also be used. The preferred directory service stack 110 includes a resident directory server application 112 (a directory server). The proxy cache server stack 120 includes a proxy server application 122 and an access control agent application 124. Each of the stacks 100, 110 and 120 includes appropriate Transmission Control Protocol (TCP) communication layers 131, 132 and 134, respectively. Likewise, each of the stacks 100, 110 and 120 includes an IP and/or IPX communication layer 140, 142 and 144 respectively. These layers enable appropriate transmission of packets, and verification of packet receipt over the network. The web site stack 150, which is one of a large number of such stacks, shows a web application 152 which provides, content which may or may not be appropriate for receipt by the client This stack includes appropriate TCP 154 and IP 156 layers. The Internet link 160, shown generally as a jagged line, connects this web site with the proxy cache server stack 120.

The proxy cache server stack 120 further includes a generalized object content filter (OCF) application 170 according to this invention. This filter is used to determine whether a web application (such as the application 152) may be accessed by the client. The filter will now be described in further detail.

Figure 3:
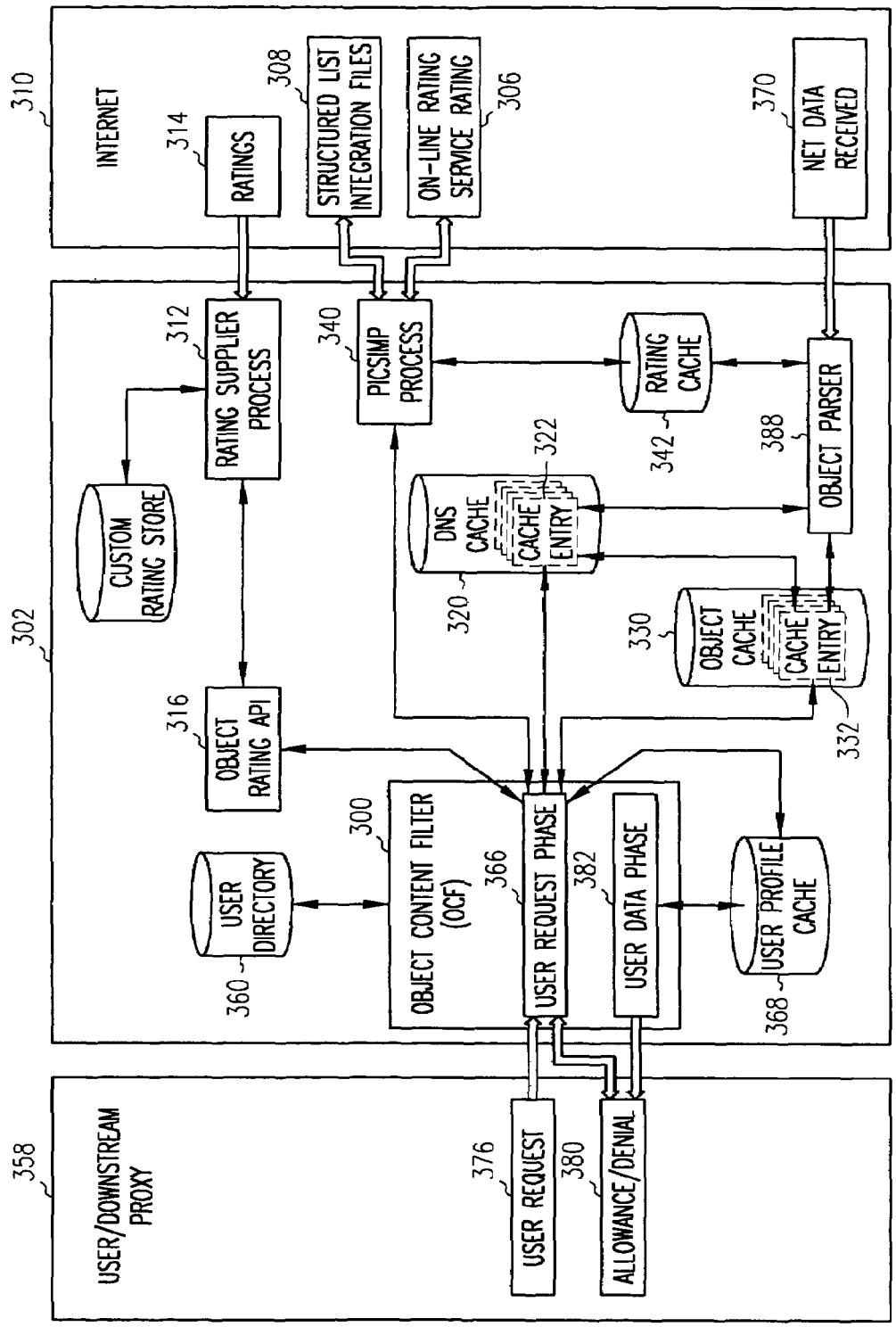
FIG. 3 is a block diagram illustrating a generalized object content filter arrangement, according to an embodiment of this invention, employing a local user directory.
Figure 4:
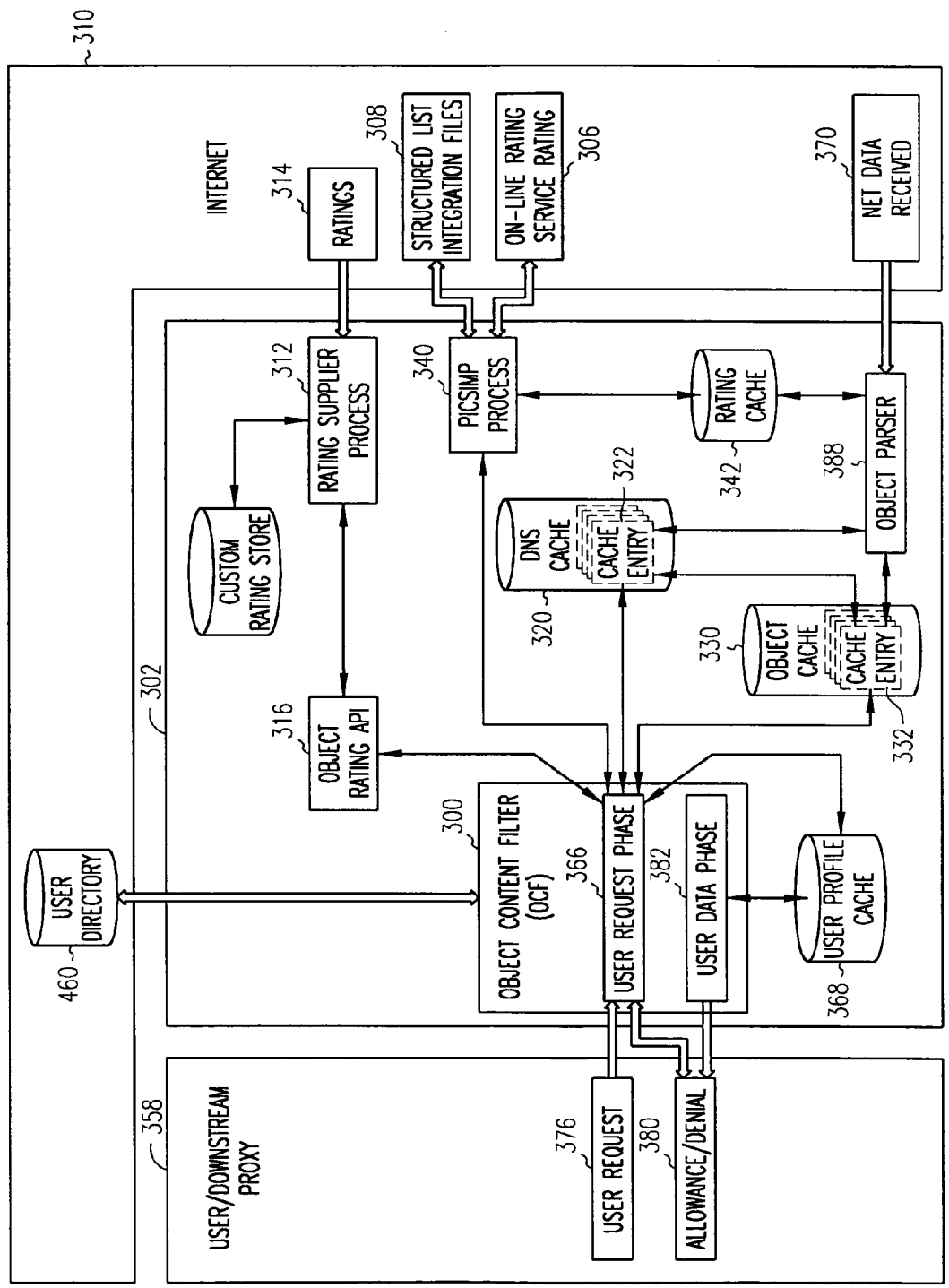
FIG. 4 is a block diagram illustrating a generalized object content filter arrangement, according to an embodiment of this invention, employing a remote user directory.

Reference will be made to FIGS. 3 and 4, which each define the elements of an object content filter and data associated therewith according to this invention. FIGS. 3 and 4 include like reference numerals for like components, and will be referred to together except where otherwise noted. FIG. 3 differs from FIG. 4 in that it includes a localized user directory within the proxy cache environment. As such it is contemplated as an NDS-based proxy cache, while FIG. 3 shows a more-generalized external directory such as a directory service accessible via LDAP. Both types of directory implementations are expressly contemplated according to this invention.

In general, this invention contemplates that web site URLs can be categorized according to a variety of rating schemes into content that is or is not appropriate for viewing and access by predetermined groups or specific users. For example, certain content may be rated as educational, and accessible by any group. Other content may be rated as pornographic or violent, and not accessible by certain (or any) user groups within the local network. For the purposes of this description, the ratings of URLs are provided by services that monitor and periodically update large lists 306, 308 and/or 314 in order to determine the category of each content provider. The services can take at least two forms. Some services are delivered in whole or in part over the Internet by accessing the web site of the service and downloading all or part of a rating list. The rating list generally includes the URL along with appropriate information. This is discussed further below. Alternatively, vendors may provide disks or other downloadable software that includes a list of current URLs that have been analyzed. In addition to URL-based ratings services, this invention can operate with late rating service providers that generate ratings based upon words and phrases found in a particular document returned from the server. One such service is the Novell Word Parser, available from Novell, Inc. of Provo Utah.

A variety of ratings schemes are typically employed by vendors. Some vendors concentrate only in providing URLs that either meet or do not meet certain criteria For example, some vendors only provide lists of acceptable educational material. Other vendors explicitly provide lists of unacceptable material based on a variety of criteria such as violence and pornographic content. Still, other vendors provide various category ratings on a large number of URLs across a wide range of content that may be both acceptable and unacceptable.

A standard format exists for defining ratings systems. This format is known as the Platform for Internet Content Selection (PICS™) standard by which labels are associated with Internet content. This standard is currently accessible via the W3C World Wide Web consortium that includes the Massachusetts Institute of Technology, the Defense Advanced Research Projects Administration (DARPA) and a variety of other inter-national computer authorities. The standards and supporting documentation are directly available through the World Wide Web through the Internet address http://www.w3c.org/PICS.

According to this embodiment, the PICS standard is utilized to define basic ratings categories. In general, to be compatible with the object content filter of this invention, each vendor should format its rating service description to conform to the PICS standard. In this manner, each vendor would provide a PICS rating service description file that describes their own in-house database of ratings information. Note that other standards are usable according to the teachings of this invention.

Again, referring to FIGS. 3 and 4, the object content filter application is depicted as the functional block 300. This application is implemented generally as an application program interface (API) typically as part of the overall Border Manager™ product available from Novell and resides within the proxy cache server. The functionalities of the filter and related blocks are integrated within the base code of the proxy cache depicted generally as the block 302. In general, the object content filter API is defined so that various content rating vendors can provide structured lists 308 that can be readily interfaced with the defined rating system. As described above, certain vendors can provide NetWare Loadable Module (NLM) applications (ratings supplier process 312) that interface directly with the filter 300. The NLM, in this case, enables a vendor's proprietary ratings structure 314 to be acquired from the vendor and to be stored in a form readable by the filter 300 based upon an object rating API 316.

The actual rating information comprises a large list of URLs for specific web content sites. Each provider may have a given specialty (e.g. some providers rate only educational material or adult content, while others rate a variety of different content types. Each type of content is ascribed one or more categories within the ratings scheme employed by the filter. This is described in further detail below. Each list of URL ratings is typically obtained over the Internet 310. The lists can be accessed by the filter each time specific web content is requested or, alternatively, it can be cached in for example a host cache (including a Domain Name System (DNS) cache 320), as an entry 322, or in an object cache 330 as an attachment to the actual data (which resides as an entry 332 in this cache). There is included a mechanism for periodic update of cached lists that is either initiated by the vendor when updates are available, or by a polling process within the filter. In each case, an Internet communication link is established between the ratings list provider/vendor and the local filter and updated list information is transferred.

It is generally contemplated that the ratings list vendors provide information according to the filter's accepted format, which, in this embodiment is the PICS standard. However, the applicable NLM can also include translation functionalities to place proprietary ratings data into a format acceptable by the filter. Ratings under the PICS implementation (PICSIMP) process 340 are stored in the rating cache 342.

The downstream user or proxy client 358, when requesting information via the local intranet, enters a URL that is intercepted by the proxy cache server application 364. The server poses a permission request to the filter 300. If the URL content is already available within the proxy cache server it will be stored as an entry in the object cache 366. The user name of the client is determined from the authentication service (LDAP in this example). Once the name has been associated, sets of rules are stored in the user directory 360 (local directory) or 460 (remote directory interconnected via the Internet in FIG. 4). User profiles are stored in a profile cache 368, and are employed in the authentication process. When a user authenticates, then the active rule set is aggregated and cached. When the user then requests content (user request 376), the rule is applied by the filter 300 (user request phase 366) to determine whether the permission to view the content is granted. The procedure for granting permission is described further below. In summary, the filter 300 accesses rating information either from the existing host cache, object cache or when a URL rating is not already cached by the proxy, from a vendor rating list via, for example, the rating cache 342. Based upon the preset user policies provided through the directory, as controlled by the system administrator (not shown), the filter either allows return of the web content/net data (370) from the appropriate cache or returns a message denying access, to the user 358 (allowance/denial 380 during user data phase 382).

As noted above, late rating services can be employed during data return to locate certain words or phrases in otherwise permissible or unrated content within the returned data 370. An object parser 388 can locate words, phrases and or other data in a document that is or is not permissible.

The structuring of rating service lists into the PICS format will now be described further. In general, the ratings service description is the basis for all URL labels provided by the list vendor. Each time there are additions or deletions from the ratings service list, the list vendor typically generates a new complete URL list that replaces the list previously provided. According to this embodiment, ratings are provided as whole numbers in which lower values are more restrictive and higher values are less restrictive. It is contemplated that each rating represents one or more given categories. Sub-categories can be supported according to alternate embodiment in which additional numbers are appended to the basic rating numbers. Where more detailed sub-categories are used, a these sub-categories can be identified as part of an overall category and sub-category concatenated string with a slash between the two parts. It is noted that certain web content providers automatically apply PICS-based HTML tags (content headers) to provided data that denote a given rating. For example, certain adult entertainment content providers include a content header in their respective web content objects that indicate adult content. According to this embodiment ratings for URLs are listed individually or grouped with a "Hildcard" prefix. According to one arrangement, the rating file can be provided in a format that includes a series of PICS labels. Each label follows the PICS-defined label format and conforms to the accompanying rating service description. URL labels in the rating file that do not currently exist in the filter database are added. Labels that contain a blank rating are removed from the database. Labels that already exist in the database are modified with any updated rating information.

Alternatively, the rating file can be provided as a binary file format containing a translation header and a list of URL/rating pairs. The format for the binary rating file is:

<Category Count>,<Total Bit Count>,
<Bit Offset>,<Bit Field Length>, <Distinguished Category Name>, ...
<URL len><URL><Rating>; where Category Count is the number of Distinguished Category Names contained in the header;

Total Bit Count represents the number of bits in the rating record. This number may be larger that the actual number of bits used to allow byte alignment. It is assumed that the bit field is always byte aligned;

Bit Offset represents the starting bit that applies to the distinguished category name. Bit offset 0 of the rating is assumed to be the first bit following the URL. Bit offset N of the rating is assumed to be the last bit in the bit field;

Bit Field Length is the number of bits, starting as bit offset, that apply to the distinguished category name. Each bit field will be parsed as if the number in little endian byte order, Distinguished Category Name is the unique name for the category as defined in the rating service description file. This is the "tansmit-as" name and must not be longer than 38 characters. For subcategories this may be in the format <category name>\<sub is category name>;

The Distinguished Category Name must be NULL terminated;

URL len is a byte value representing the length of the URL string;

URL is the actual URL being rated (this string is not NULL terminated); and

Rating is a bit string containing the rating values. Bit 0 of the rating is assumed to be the first bit following the URL. Bit N of the rating is assumed to be the last bit in the bit field.

By way of example a sample ratings file is now described. Note that the <URL len><URL><Rating> entries are displayed on individual lines for reading convenience only. In the actual download file they should appear consecutively. And, the numbers displayed for the URL length and rating are the hexadecimal representations of an exemplary ratings file entry:

5, 16,
0, 1, Music,
1, 1, Video,
2, 2, Profanity,
4, 3, Medical,
8, 3, Political,
12http://www.abc.com8400
13http://www.defg.com0240

For list maintenance purposes, each URL/rating pair in the binary rating file will constitute one transaction on the locally maintained rating database. URLs not currently in the database will be added and URLs that already exist in the database will be updated with the new rating. To remove a rating from the database, the URL should be included and the entire rating field should be set to 1's (this includes any bits used for padding).

The following is a description of the manner in which the object content filter interacts with the rating service providers in order to enforce the content filtering policy established to the particular network, and how that policy is gathered from the user directory 360, 460.

The following definitions are provided in connection with the filtering process:

Category—an element of a rating system that represents a series of values for which content or (URL) can be rated.

Rating—one or more category values provided by a rating supplier for specific content (or URL).

Threshold—a value that exists within the list of possible values for a category.

Rule—an element of a user's filtering policy that combines one category with an acceptable threshold and one or more actions.

Actions—include allow vending of content/page; block content/page (due to rating); block unrated content/page; monitor but vend content/page and log in a file (also warn of questionable content/page, but give option to user to receive or not receive)

When the proxy cache is initiated, the list of processes required to support the rating suppliers is initiated. As each rating supplier process is initiated, it registers with the filter by sending information regarding the nature of the ratings list or lists supported. As each ratings supplier process registers with the filter, the filter creates a vendor object detailing the type of rules the vendor supports and how to request ratings from the vendor on an ongoing basis (e.g., on the fly). The ratings supplier (or list vendor) is responsible for determining whether the categories it supports are to be used as allow rules or deny rules. In other words, certain rules are used to allow certain content but deny all others, while other rules are used to allow any content that is not denied. This rule information is conveyed to the filter at registration time. Because of the processing order during the rules evaluation phase (to be described below), it is desirable that the filter know if the vendor supports one or both types of rules (e.g., allow or deny).

Once the vendor object is complete, the filter places it in a list of vendor objects. The list of vendor objects is ordered by the type and number of rules each vendor supports. The order is defined as: Exception List; Allow Rule Only Vendors; Allow Block Rule Vendors; Block Rule Only Vendors. When a ratings supplier is disabled or removed from the system, it notifies the filter of the change. The filter marks the vendor object with a rating supplier as being disabled so that no rules for the vendor are processed. The vendor object is removed from the list of vendor objects and deleted when all the users who are dependent upon that vendor's rules have disconnected from the proxy cache, or those users applicable rules have been changed to exclude the disabled rating supplier.

Each ratings supplier process is responsible for updating the list of ratings at a predetermined interval. When the list update is completed, the rating supplier process notifies the filter of the new time stamp for the updated list. The filter updates its vendor object and uses the new time stamp to invalidate any ratings for that vendor which are found in the cache prior to the time stamp. Rating invalidation is discussed further below with reference to the rules evaluation procedure.

A rule contains sufficient information to act on at least one category for one rating supplier. The rating supplier determines what list of categories it supports, as described generally above and whether each category can be used to allow or deny access to Internet with content. The portion of the rules stored in the directory on the user object and/or any group or containment object specifies the limit value or threshold to be applied for the rule. Also stored is whether the rules should be used for allowing, blocking or monitoring access, and if the value can or cannot be overridden by other rules available to the evaluation process. Categories that are defined as allow by the rating supplier can have allow or monitor actions that are defined by the user rule. Categories that are defined as deny by the rating supplier can have deny, monitor or warn actions defined by the user rule.

As a user is authenticated to the proxy, the filter queries the directory for a list of rules contained in the user object. The rules are placed in a list ordered the same as the vendor objects in the vendor list. This is described further above with respect to ratings supplier registration. The filter then queries the groups and the containment hierarchy for rules that can place further limitations on that user's rule set. When this process is completed, the filter has generated a user object, which contains a concise list of rules to be applied to the user before Internet content is either allowed or denied. Each rule contains a pointer to the hosting vendor object to eliminate any need to match the vendor to the rule during the rule evaluation process.

Figure 5A:
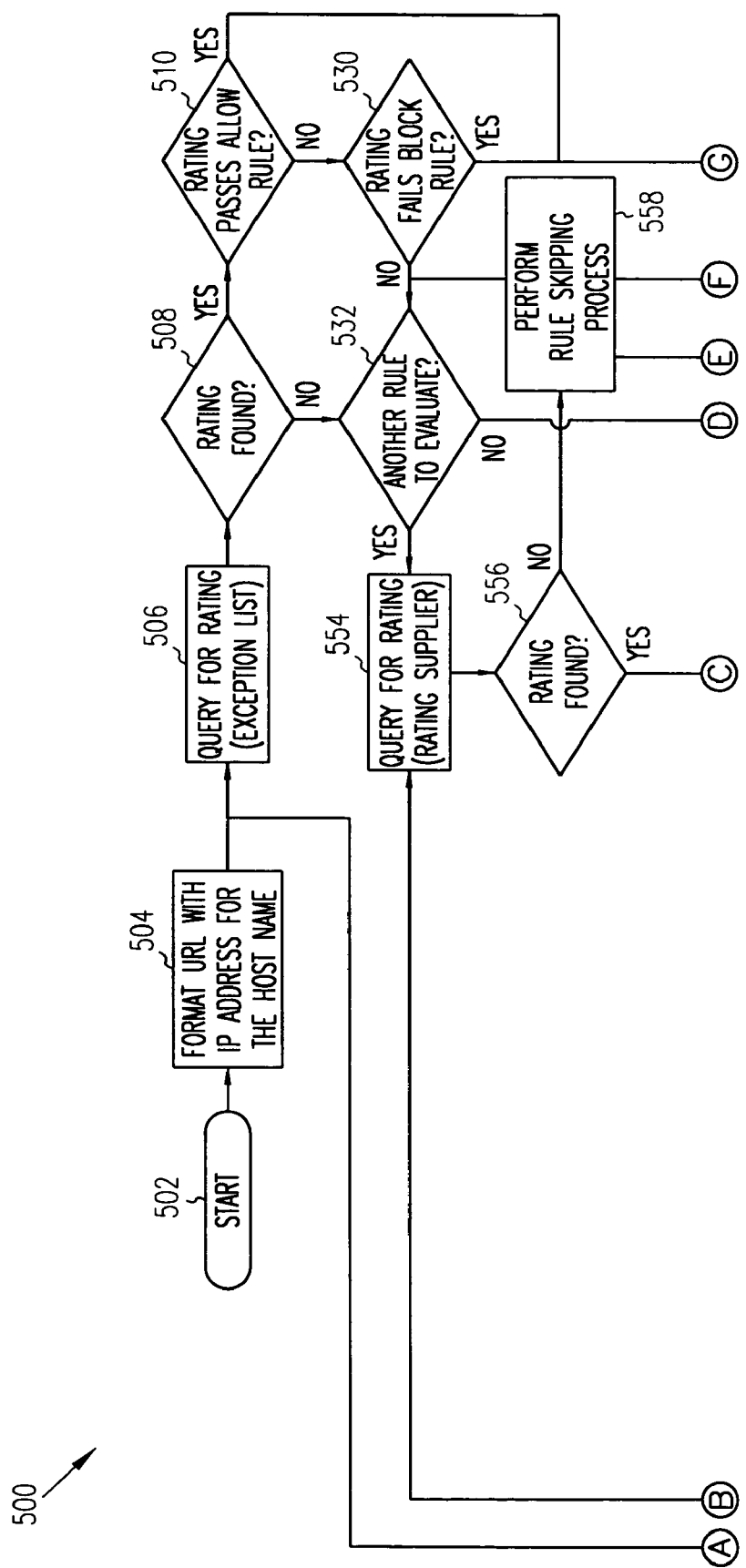
FIG. 5 is a flow diagram detailing an overview of the object content filter user rules evaluation process according to this invention.
Figure 5B:
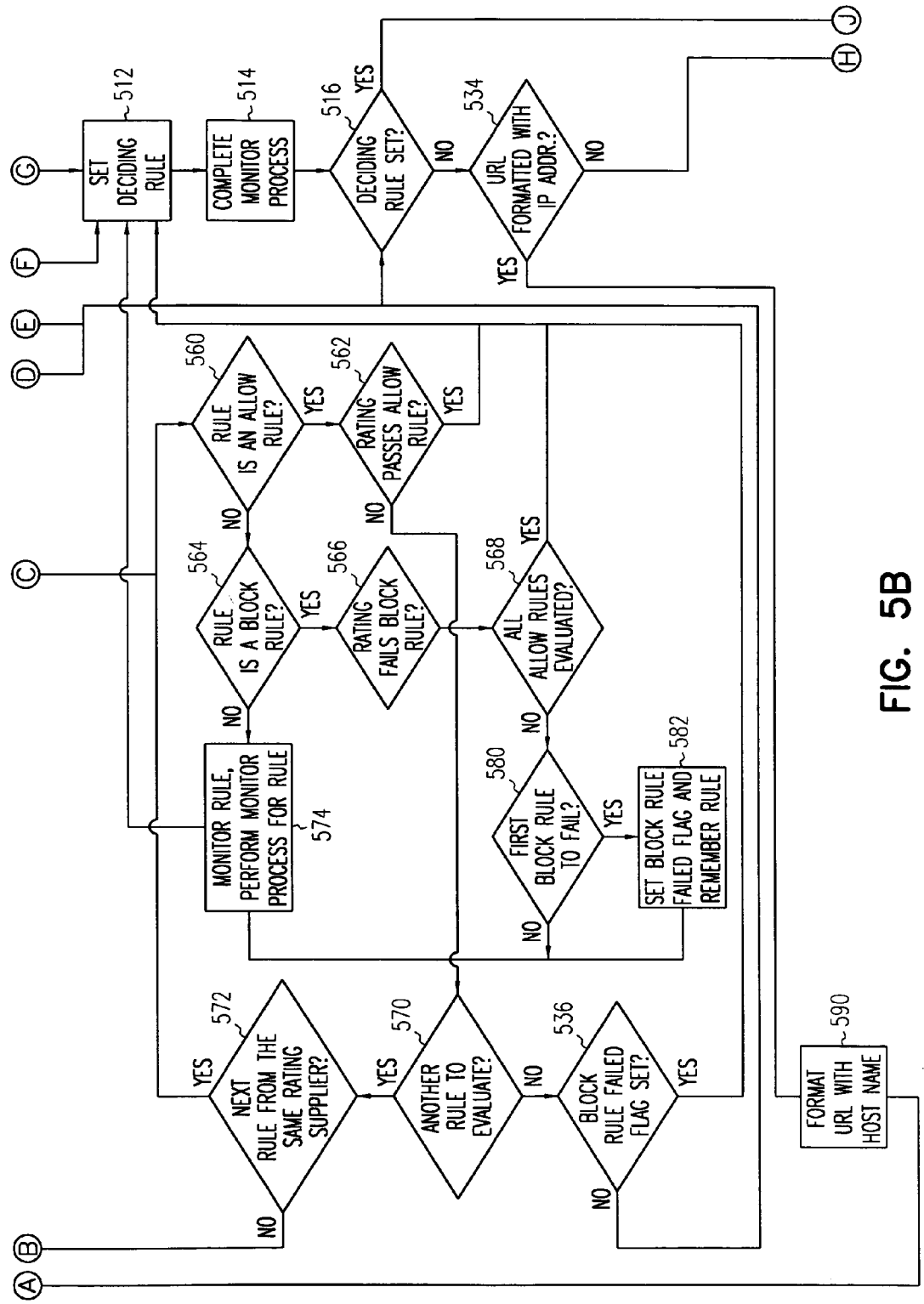
Figure 5C:
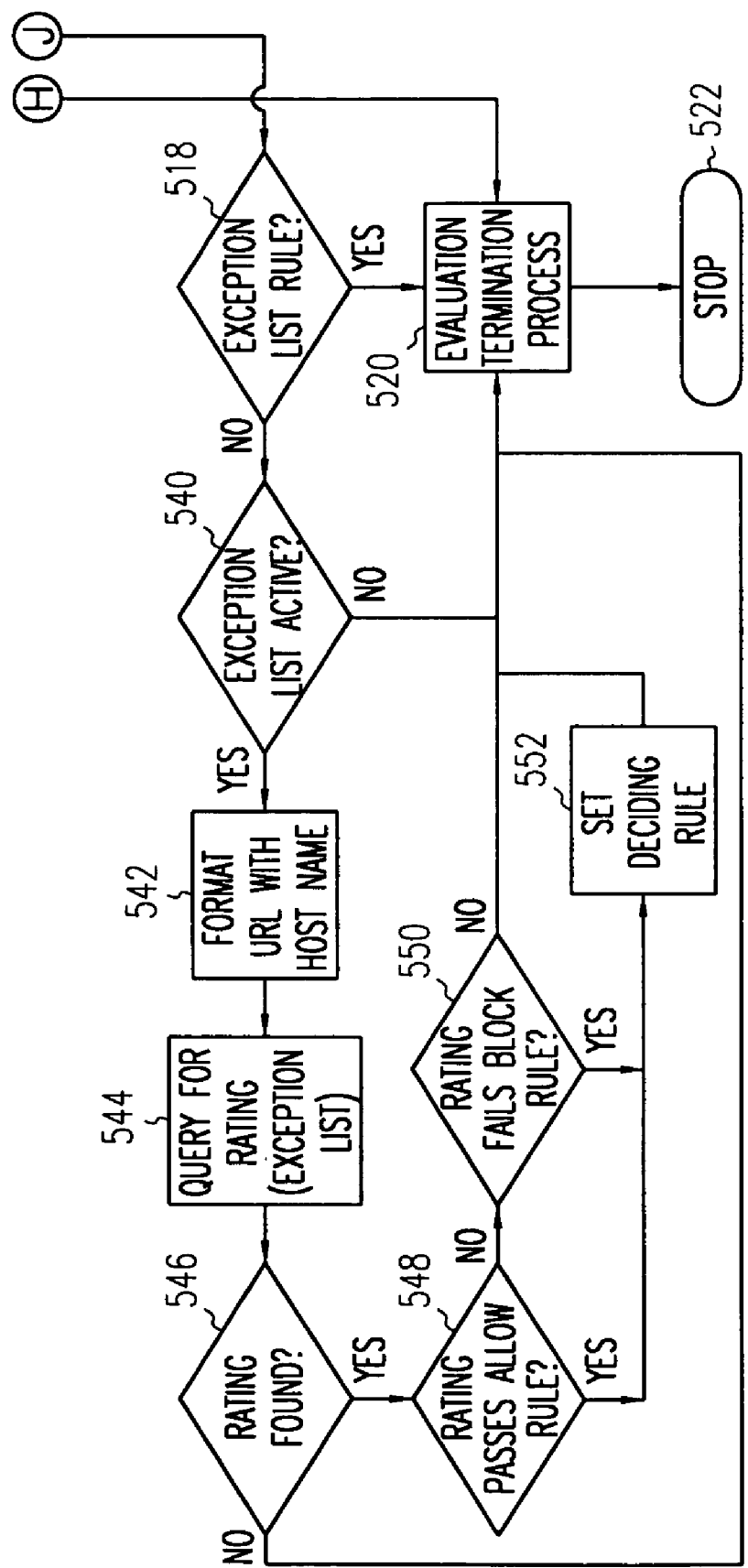

Reference is now made to FIG. 5, which describes in detail the rule evaluation process according to a preferred embodiment of this invention. Rule evaluation occurs in the user request phase (366) before the proxy requests information from the Internet and also at the user data phase (382) before the proxy sends the acquired data to the user. The rules evaluation process operates similarly in both the user request phase and the user data phase. Typically, the rating service providers checked at each phase is different as described generally above, during the user request phase, ratings service providers that use a pre-configured list of sites (308). During the user data phase, the filter checks rating service providers that use on-line rating systems (306), content parsing/or embedded rating tags. Hence, a user request may pass the user request phase because it is not rated by the particular rating service providers applicable, but maybe denied by rating service providers relative to the user data phase.

Request by the user for Internet content causes the filter to receive the user object and begin processing the rules in the order in which they are defined (e.g., Exception List; Allow Rule Only Vendors; Allow and Block Rule Vendors; Block Rule Only Vendors).

Figure 6A:
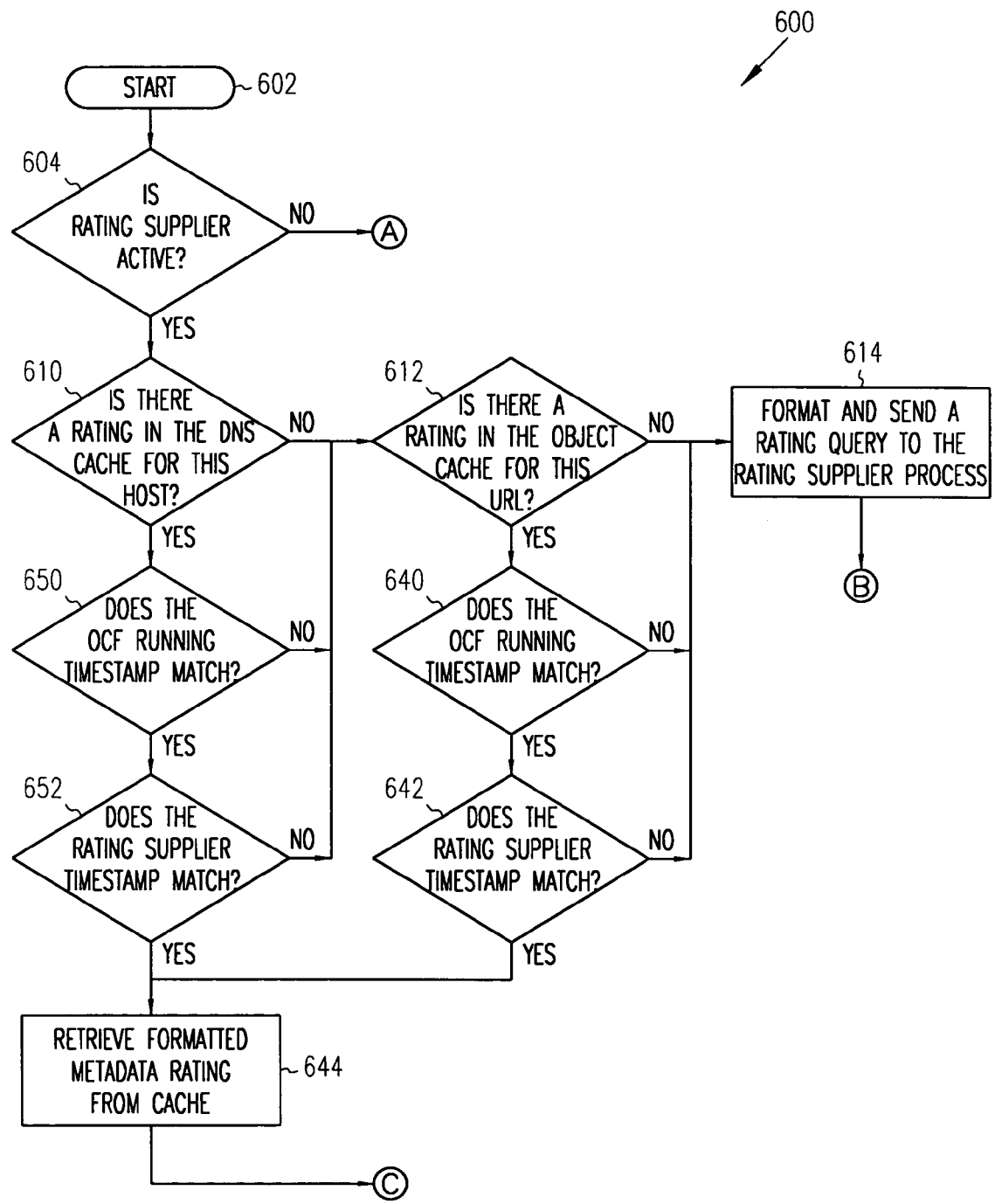
FIG. 6 is a flow diagram of the rating query process for the evaluation process of FIG. 5.
Figure 6B:
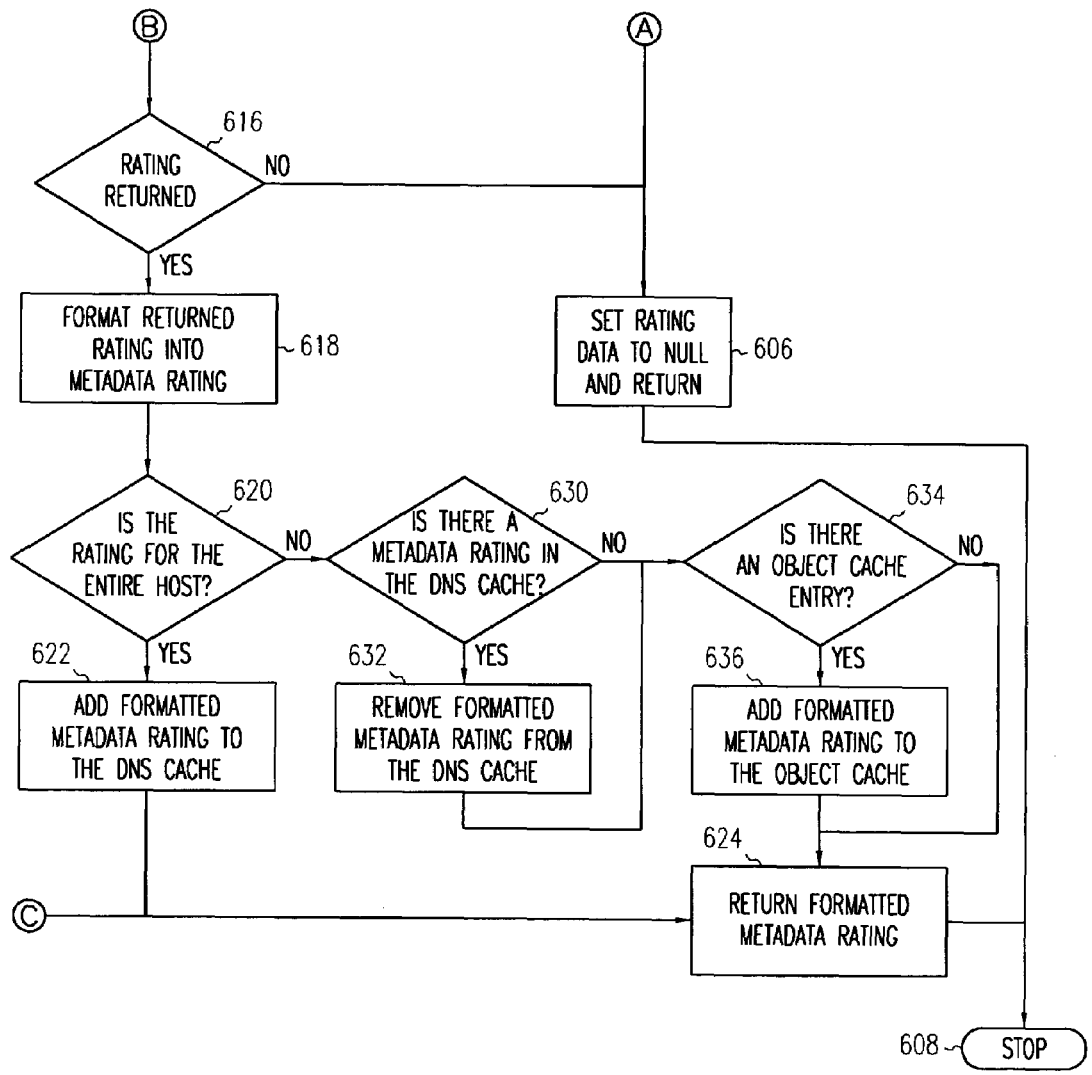

According to FIG. 5, the rule evaluation process 500 begins at start block 502. The requested URL is first formatted with an IP address for the host name according to process block 504. Next, the exception list hosted by the PICS implementation process (PICSIMP 340) is queried for a rating from the exception list in process block 506. Referring now to FIG. 6, the process of querying for a rating is shown. This process will be described generally, and referred to at various times during the description of the evaluation process. For the purposes of this description, the exception list that is queried in process block 506 is treated as another rating supplier that is supported by the PICS implementation process.

According to FIG. 6, the ratings query process 600 begins at start block 602. The decision block 604 determines whether or not the rating supplier (exception list or rating service) is active. Again, the exception list is treated as a rating supplier for the purposes of this description. If the rating supplier is not active, the process branches to block 606, returning a set of rating data that is null and the process ceases in stop block 608. If the rating supplier is active, the process branches to decision blocks 610 to determine whether there is a rating in the DNS cache (320) for the particular host. If there is no rating, then the process branches to decision block 612. At decision block 612 it is determined whether a rating is in the object cache (330) for the requested URL. If there is no rating in the object cache, then the process branches to block 614. At this time, a rating query is formatted and sent to the rating supplier process. If no rating is returned, then decision block 616 branches to block 606 returning a null set. If however, a rating is returned then the returned rating is formatted into a metadata rating in block 618 so that the rating is usable by the system. The block 618, having created the metadata rating, then branches to decision block 620 to determine whether the rating is relative to the entire host (e.g., web site). If the rating is relative to the entire host, then the formatted metadata rating is added to the DNS cache at block 622 and the formatted metadata rating is returned according to block 624., The query process ceases at block 608, and the main rules evaluation process 500 (FIG. 5) continues.

Still referring to FIG. 6, if the rating is not for the entire host according to decision block 620, then the process branches to decision block 630 to determine whether there is a metadata rating in the DNS cache already. If so, the formatted metadata rating is removed from the DNS cache in block 632 and the process branches to decision block 634 where it is determined whether an object cache entry (332) exists. Similarly, if there is no metadata rating in the DNS cache according to decision block 630, the process again branches to decision block 634 to determine whether an object cache entry exists. If there is an object cache entry, the process branches to block 636. At this time, a formatted metadata rating is added to the object cache entry. The process again returns the formatted metadata rating at this time according to block 624 and stops (block 608). If there is no object cache entry according to decision block 634 then the process branches directly to block 624 to return the formatted metadata rating and stops (block 608).

Returning to decision block 612, if there is a rating in the object cache for the particular requested URL, then the process branches to decision block 640 which determines whether the filter's time stamp matches that of the rating. If not, then the process branches back to block 614 and the above-described steps are repeated. If the filter time stamp matches, then the process branches to decision block 642. At this time, the process determines whether the rating supplier time stamp matches that of the object cache. If not, then the process again branches back to block 614. If the time stamp does match, then the process branches to block 644 in which the formatted metadata rating is retrieved from the cache since it has not changed and the process returns the formatted metadata rating in block 624, finally stopping in block 608.

Referring again to 610, if a rating exist in the DNS cache for the host (requested web site), then the process branches to decision block 650. At this time, the process determines whether the filter time stamp matches that of the DNS cache rating entry. If the time stamp does not match, then the process branches back to decision block 612. If the filter time stamp does match, then the process branches to decision block 652 where, again, the process determines whether the rating supplier time stamp matches that of the DNS cache entry for the particular host. Again, if it does not match, then the process branches back to decision block 612. If, however, the time stamp does match, then the formatted metadata rating is retrieved from the cache (block 644) and returned (block 624). The process ceases at stop block 608.

Referring again to the main rule evaluation process 500 (FIG. 5), once the exception list is queried for a rating on the requested content, decision block 508 determines whether a rating was found. If a rating is found, then the process branches to decision block 510, determining whether the rating passes the allow rule. If the rating passes the allow rule, then the process branches to block 512 where the rule that decides the status of the requested content is set. The process then branches to block 514 in which the completion of any monitoring processes occurs. The generalized monitoring process is described further below. In summary, monitoring involves the vending of a page, but logging of the requested content in a file for further review by personnel. A warning can also be given about the possible nature of the content. Once the monitoring process is completed, the rule evaluation process branches to decision block 516. If the deciding rule is set, which in this case it has been in block 512, then the procedure branches directly to decision to block 518. At this time the process determines whether the deciding rule is an exception list rule. If it is an exception list rule, then the evaluation termination process is initiated in block 520. The evaluation termination process is described in detail in FIG. 9.

Figure 9:
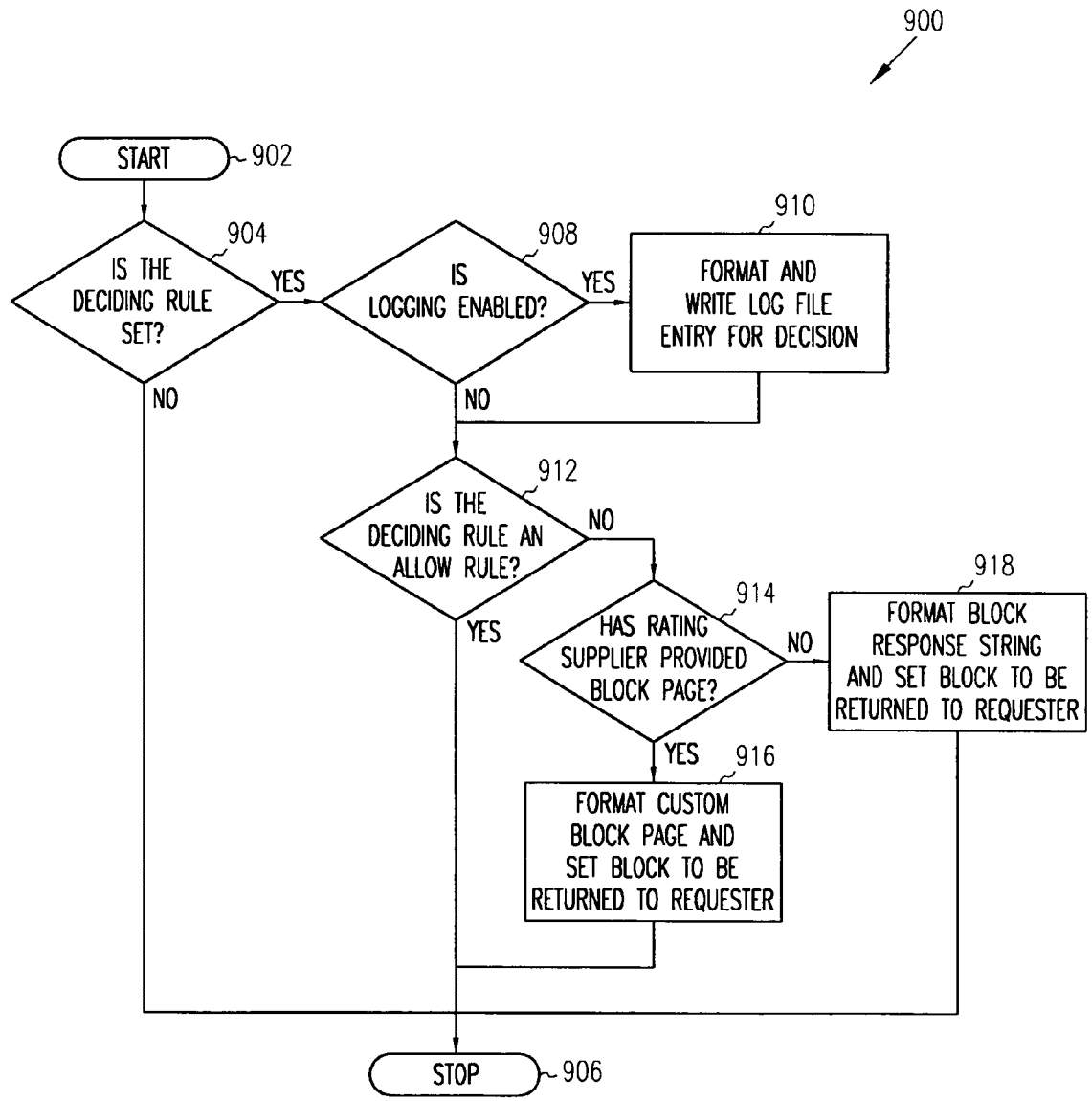
FIG. 9 is a flow diagram for the termination process of FIG. 5.

Referring to FIG. 9, the evaluation termination process 900 begins at start block 902. First, decision block 904 determines whether the deciding rule is set. If the deciding rule is not set, then the process simply stops at stop block 906. If the deciding rule is set, then the process branches to decision block 908. If logging of decisions is enabled, then a log file entry for the decision is formatted and written in block 910. The process then branches to decision block 912 conversely, if logging is not enabled, then decision block 908 branches directly to decision block 912. In decision block 912 the process determines whether the deciding rule is an allow rule. If the deciding rule is an allow rule then the process terminates at block 906. If the deciding rule is not an allow rule, then the process branches to decision block 914. The process determines whether a rating supplier has provided a blockpage rating. If so, then decision block 914 branches to block 916 where a customized blockpage action is taken and a set block decision is returned to the requestor. The process then stops at block 906. If, however, a blockpage rating is not returned, decision block 914 branches to block 918 where a block response string of characters and a corresponding set block response are sent back to the requestor. The process then stops at stop block 906.

Reference is again made to the rule evaluation process 500 of FIG. 5. Following the termination of the evaluation process in block 520 (see also FIG. 9), the rule evaluation process 500 ceases at stop block 522. If the content is allowed, then the termination process ends with the vending of the content to the user. Conversely, if the content is not allowed, then the content is not vended (e.g. it is blocked). Referring again to decision block 510, if the rating does not pass an allow rule, then the process branches to decision block 530, which determines whether the rating fails a block rule, then the process branches to process block 512 where the deciding rule is set. If the rating does not fail a block rule in decision block 530, then the process branches to decision block 533 where the process searches for another rule to evaluate. This will be described further below.

Referring again to decision block 516, if a deciding rule is not set, then the process branches to decision block 534, where it is determined whether the requested URL is formatted with an IP address. If it is not, then the process branches to the evaluation termination process block 520. If the URL is formatted with an IP address, then the process branches to process block 590. The URL is then formatted with the particular content host name and the process branches back to block 506 in which a query for a rating from the exception list occurs.

Referring again to decision block 518, when the evaluation process determines that the deciding rule set is not an exception list rule, then the process branches to decision block 540 to determine whether the exception list is active. If it is not active, then the process branches back to the evaluation termination process block 520 (also FIG. 9). If the exception list is active, then the process branches to process block 542 where a URL with the content host name is formatted. The process then queries for a rating from the exception list in block 544. The query process is in accordance with the steps described above in FIG. 6. The evaluation process then branches to decision block 546 to determine whether a rating has been found by the query process. If no rating is found, then the process branches again to the evaluation termination process block 520 (also FIG. 9). If a rating is found, then the evaluation process branches to decision block 548. In block 548, the process determines whether the rating passes an allow rule. If it does not, then the evaluation process branches to decision block 550 where it is determined whether the rating fails a block rule. If it does not fail a block rule, then the evaluation process branches to the evaluation termination process in block 520 (also FIG. 9). If the rating either passes an allow rule or fails a block rule, then the deciding rule is set in process block 552 and the evaluation process branches, yet again, to the evaluation termination block 520 (also FIG. 9).

Reference is again made to decision block 508 of the evaluation process 500. If a rating for the requested host/content is not found on an exception list, then the decision block 508 branches to decision block 532. Note that decision block 532 is also called if an exception list rating does not pass an allow rule and does not fail a block rule via decision block 530. In decision block 532, the process determines whether there is another rule to evaluate. Recall that rules are processed as described above according to a specific order: Exception List; Allow Rule Only Vendors; Allow Block Rule Vendors; Block Rule Only Vendors. Typically, once all rules in the order are exhausted, then there are no more rules to evaluate. If so, then the evaluation process branches to decision block 516, and the process continues as described above. If, however, there are more rules to evaluate, then the evaluation process branches from decision block 532 to process block 554 where the rating query process is undertaken again. In this instance, the rating query process (as described generally in FIG. 6) is performed for a given rating supplier rather than for the exception list The evaluation process branches from process block 554 (rating query of FIG. 6) to decision block 556 to determine whether a rating has been found by the query process. If no rating is found, then the process branches to the rule-skipping process as set forth in block 558. As described further below, the results of the rule-skipping process can enable a branch back to one of decision block 532, decision block 516 or process block 512. In general, the rule-skipping process can either set a block-rule flag and/or terminate the evaluation process as if a block rule has failed. The rule-skipping process is described further in FIG. 7.

Figure 7:
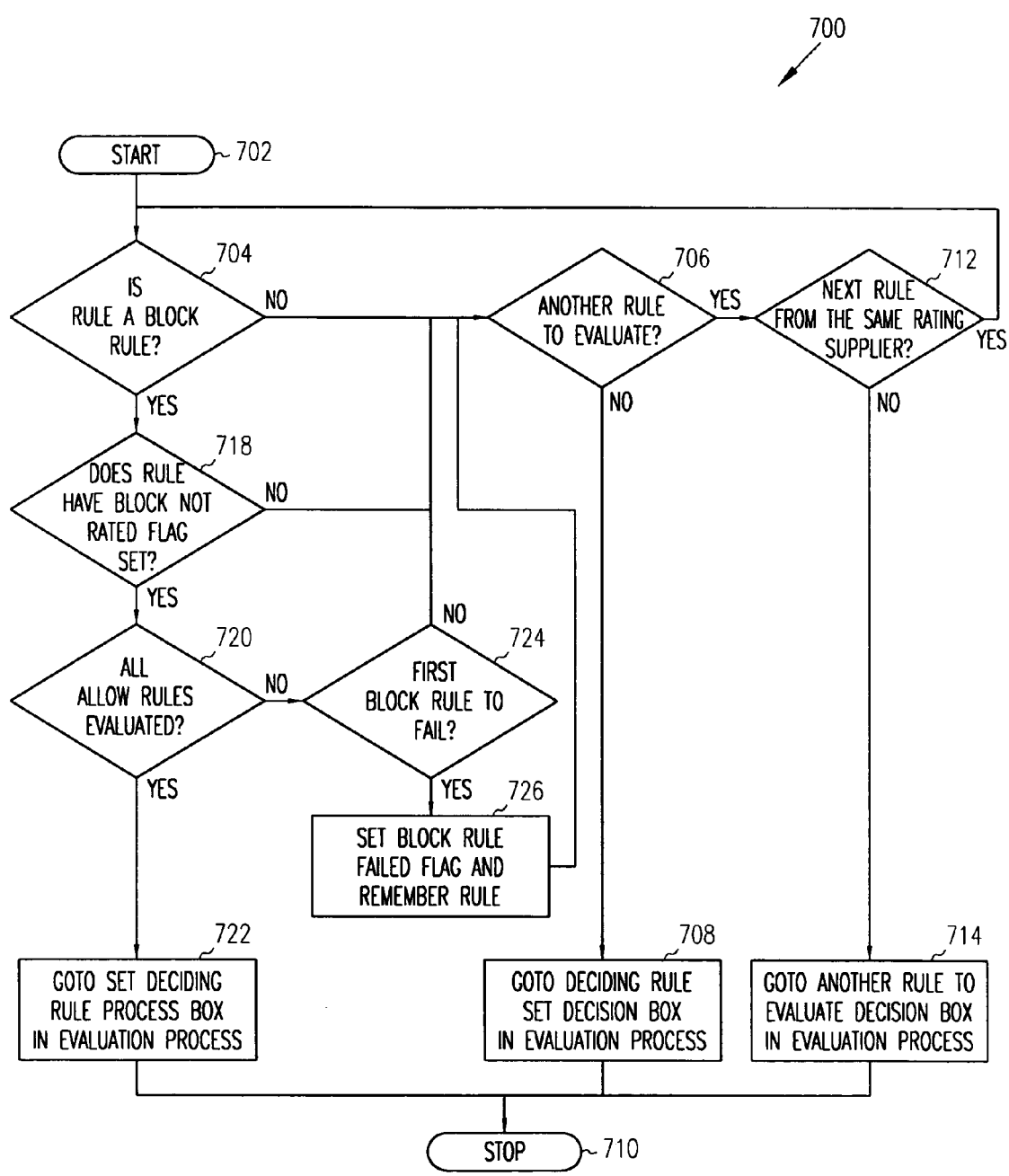
FIG. 7 is a flow diagram of the rule-skipping process for the evaluation process of FIG. 5.

According to FIG. 7, the rule-skipping process 700 begins at start block 702. The process proceeds to decision block 704, in which it is determined whether the rule is a block rule. If the rule is not a block rule then the process proceeds to decision block 706 in which it is determined whether there is another rule to evaluate. If there is not another rule to evaluate, then the process branches to a block 708 instructing the evaluation process 500 to branch to the deciding rule set decision block 516. The process 700 then stops according to stop block 710. If decision block 706 determines that there is another rule to evaluate, then the process branches to decision block 712. The rule-skipping process then determines whether this rule is a next rule from the same rating supplier. If it is not the next rule from the same rating supplier as the previous rule, then the rule-skipping process branches to process block 714, instructing the rule evaluation process 500 to branch back to its decision block 532. Conversely, if rule-skipping decision block 712 determines that the next rule is from the same rating supplier, then the rule-skipping process branches back to original decision block 704 to determine whether the next rule is a block rule. If either the first rule or a next rule from the same rating supplier is a block rule, then decision block 704 branches to decision block 718. Decision block 718 determines whether the rule is associated with a block-not-rated flag (e.g. a flag set to block unrated content). If the block-not-rated flag is set, then the decision block 718 branches to decision block 720. If all the allow rules have been evaluated then the procedure branches to process block 722 which causes the rule evaluation procedure 500 to branch to the set deciding rule block 512. If the rule does not have a block-not-rated flag set, then the process branches to decision block 706 and continues as described above. Similarly, if the block-not-rated flag is set, but all allow rules have not been evaluated, then the decision block 720 branches to decision block 724. The decision block 724 determines whether the block rule is the first block rule to fail. If so, then block-rule-failed flag is set and the particular rule is committed to storage according to block 726. The process then branches back to decision block 706. If, however, the block rule is not the first to fail, then the decision branches directly back to block 706.

Referring again to the rule evaluation process 500, if decision block 556 determines that a rating of the rating supplier has been located, then the evaluation procedure branches to decision block 560. In decision block 560, the process determines whether the rule is an allow rule. If the rule is an allow rule, then the process branches to decision block 562. Decision block 562 determines whether the rating passes an allow rule. If the rating passes an allow rule then the process branches back to process block 512 where the deciding rule is set.

If the rule is not an allow rule, according to block 560, then the process branches to decision block 564. This block determines whether the rule is a block rule, then the process branches to block 566 where it is determined whether the rating fails the block rule. If the rating fails the block rule then the process branches to decision block 568. This block determines whether all allow rules have been evaluated. If all allow rules have been evaluated, then the host content remains blocked, and the evaluation procedure branches back to block 512 to set the deciding rule.

Referring back to block 562, if the rule is an allow rule, but the rating does not pass the allow rule, then the process branches to decision block 570. This block determines whether there is another rule to evaluate. If there is no remaining rule to evaluate, then the process branches to decision block 536 to determine whether the block-rule-failed flag is set. If it is not set, then the decision block 536 branches to the deciding rule set block 516. Conversely, if the block-rule-failed flag is set then the deciding rule becomes set in block 512. If there is another rule to evaluate, then the decision block 570 branches to decision block 572. This block determines whether a next rule from the same rating supplier exists. If no further rule from this supplier exists, then the evaluation process branches back to block 554 to query for a rating from another rating supplier. If, however, a next rule from the same rating supplier does exist, then the decision block 572 branches back to decision block 560 to determine whether the next rule an allow rule.

Figure 8:
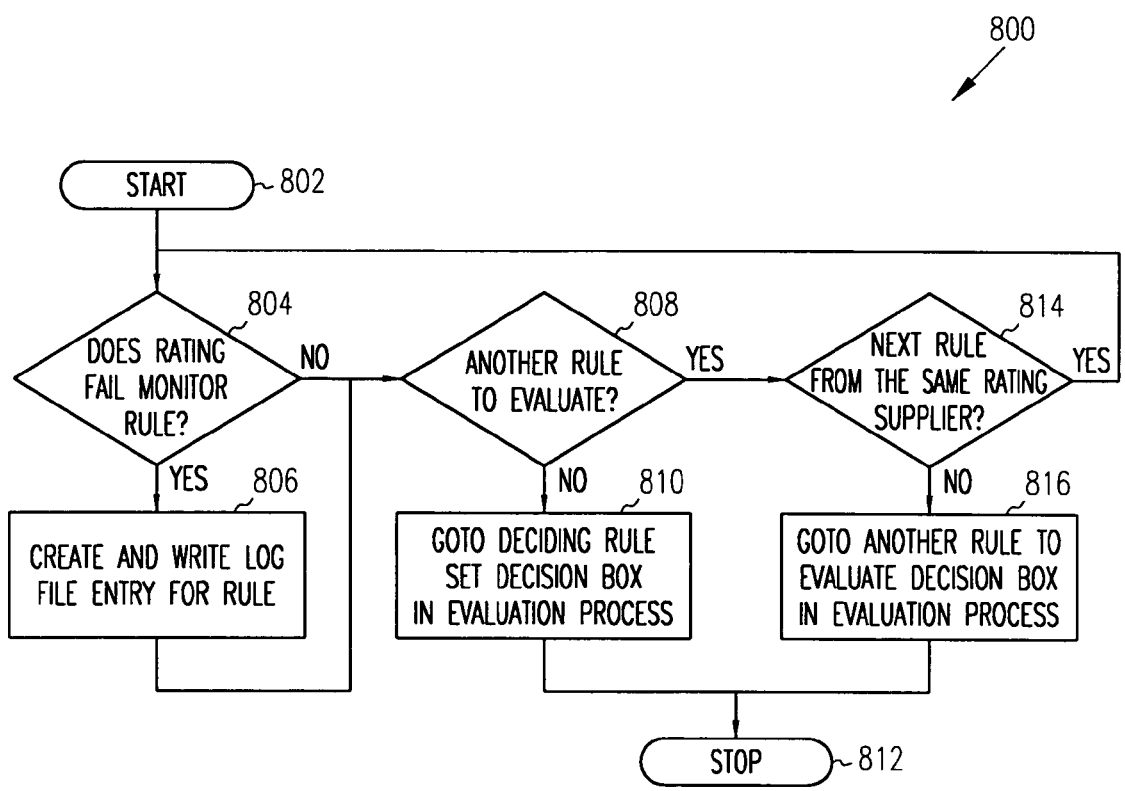
FIG. 8 is a flow diagram of the monitoring process for the evaluation process of FIG. 5.

Referring to decision block 564, if the rule is not a block rule and is not an allow rule, then the process branches to the monitor rule process block 574. The monitor rule process is described further in FIG. 8. The monitor rule process 800 initiates at start block 802. The process begins at decision block 804 in which it is determined whether the rating fails a monitor rule. In general, this means that the rating requires monitoring of use and access to particular content Monitoring typically entails the vending of questionable or unrated content, along with the logging of content to a file for future review. As an option, there can be included the transmission of a warning of questionable content to the user with a prompt to the user to either accept or refuse the transmitted content.

If the rating fails the monitor rule then the process branches to block 806 in which a log file entry for the rule is created and written. The process then branches to decision block 808. Similarly, if the process does not fail the monitor rule then the monitor process 800 branches directly to decision block 808. In decision block 808, it is determined whether there is another rule to evaluate. If not, then the monitor process 800 branches to the set deciding rule block 512 in the rule evaluation process 500. This occurs in block 810. The monitor process 800 then ceases at stop block 812. If, however, there is another rule to evaluate, the monitor process branches to decision block 814 in which the process determines whether there a next rule from a rating supplier. If there is a next rule, then the process branches back to decision block 804 to determine if the rating fails the monitor rule. If there is not next rule from the same rating supplier then the decision block 814 branches to block 816 that directs the process to go to the evaluation process decision block 570 to search for another rule to evaluate. The rule evaluation process 500 proceeds from this point as described above.

Reference is now made to evaluation process decision block 566. If the rule is a block rule according to decision block 564, but the rating does not fail the block rule, then the decision block 566 branches to 570, again searching for another rule to evaluate.

Similarly, if the rule an allow rule according to decision block 560, but the rating does not pass as an allow rule, then the process branches to decision block 570, searching for another rule to evaluate.

Referring to decision block 568, if the rule is a block rule according to decision block 564, and the rating fails the block rule, according to decision block 566, then as described above, the process branches to decision block 568 to determine if all allow rules have been evaluated. If all allow rules have not been evaluated then the process branches to decision block 580. Decision block 580 then determines whether this is the first block rule to fail. If it is the first block rule to fail, then the process branches to block 582 to set the block-rule-failed flag and to commit the rule to storage. If, however, this is not the first block rule to fail, then decision block 580 branches directly to decision block 570 to determine whether there is another rule to evaluate.

Finally, referring to decision block 516, if the deciding rules has not been set, then the process branches to decision block 534 to determine whether a URL formatted with an IP address exists. If it does not exist, as described above, the process terminates at block 520. If, however, a URL with an IP address exists, then the process branches to process block 590. The URL is then formatted with the particular content host name and the process branches back to block 506 in which a query for a rating from the exception list occurs. The rule evaluation process continues therefrom as described above eventually resulting in the vending or blocking of content with monitoring, warning or other action as deemed appropriate.

The foregoing has been a detailed description of a preferred embodiment of the invention. Various modifications and additions can be without departing from the spirit and scope of the invention. For example, while the preferred embodiment specifies use of the PICS standard, a variety of rating standards, both proprietary and freely available, can be utilized. In addition, a multiplicity of rating standards can be employed by the system with appropriate procedures for differentiating between these systems. The particular caching technique used for various data can be modified or expanded and caches can be resident on a variety of physical memory structures. According, this invention is meant to be taken only by way of example and not to otherwise limit the scope of the invention.

What is claimed is:

1. A method to filter content, comprising: automatically acquiring from an online ratings vendor a rating associated with content, the rating is acquired from the online ratings vendor remotely and over a public Internet communication network, the ratings is acquired in a list that is acquired from the vendor over the Internet and when the rating is permissible the content is scanned for words or phrases that are not permissible and when found an additional rating generated, and wherein the rating in the list is in a Platform for Internet Content Selection (PICS) format and the vendor supplies a software module to implement the rating on a client, and the rating is a content rating for the content assigned from categories and sub-categories in response to criteria applied by the vendor to the content;

comparing the rating and the additional rating when present to policies associated with the client;

permitting the client to acquired the content if permitted by the policies; and denying the client access to the content if the policies do not permit; wherein automatically acquiring the rating further includes dynamically inspecting, by the ratings vendors, information in the content and dynamically producing the rating based on the dynamic inspection; and wherein enforcing the one or more policies further includes: determining that the rating acquired from the ratings vendor is deficient for purpose of enforcing the one or more policies; acquiring the content from a content provider; and acquiring from a rating supplier a modified rating for the rating based on the content that is supplied to the ratings supplier.

2. The method of claim 1, further comprising: pre-acquiring the content on a gateway proxy server; and applying the policies for the client on the gateway proxy server.

3. The method of claim 1, further comprising receiving, from the client, a request for the content before automatically acquiring the rating.

4. The method of claim 1, wherein automatically acquiring further includes acquiring the rating for the content from the list of ratings provided by the ratings vendor, wherein a number of other ratings for other content of a content vendor is provided in the list.

5. The method of claim 1, further comprising housing the rating and additional rating when present for the content in a cache of a gateway proxy server for subsequent use when the content is requested by the client again or requested by other clients.

6. The method of claim 1, further comprising identifying the content as a Uniform Resource Location (URL) sent from the client and intercepted by a gateway proxy server, wherein the URE is directed to a content provider and the ratings vendor provides the rating for the content the gateway proxy server.

7. A method to filter content, comprising:

intercepting a client request for content;

acquiring one or more policies for the client with respect to receiving the content;

searching cache for a rating for the content;

acquiring the rating from an online ratings vendor when the rating is not in the cache, the rating is acquired from the online ratings vendor within a list and the list acquired remotely over the Internet, and the online ratings vendor supplying a software module to implement the rating on the client and when the rating is permissible further scanning the content for words or phrases that are not permissible and when present in the content generating an additional rating, and the rating is not content rating for the content assigned from categories and sub-categories in response to criteria applied by the online ratings vendor to the content wherein the rating in the list is in a Platform for Internet Content Selection (PICS); and enforcing the one or more policies against the rating and the additional rating when present to determine whether the client is permitted to receive to receive the content or is denied access to the content; wherein automatically acquiring the rating further includes dynamically inspecting, by the ratings vendors, information in the content and dynamically producing the rating based on the dynamic inspection; and wherein enforcing the one or more policies further includes: determining that the rating acquired from the ratings vendor is deficient for purpose of enforcing the one or more policies; acquiring the content from a content provider; and acquiring from a rating supplier a modified rating for the rating based on the content that is supplied to the ratings supplier.

8. The method of claim 7, further comprising pre-acquiring the content and storing the content in cache after intercepting the client request.

9. The method of claim 8, further comprising retaining the rating and the content in the cache for subsequent requests of the client for the content or for new requests for the content from other clients.

10. The method of claim 7, wherein acquiring the rating from the ratings vendor further includes receiving the rating as a category and searching a predefined list of categories to determine if the category is acceptable or unacceptable.

11. The method of claim 7, wherein intercepting the client request further includes identifying the request for the content as a Uniform Resource Locator (URL) associated with a content provider and determining an identity of the rating vendor based on an identity of the content provider.

12. The method of claim 7, wherein enforcing the one or more policies further includes: determining that the rating acquired from the ratings vendor is not rated by the ratings vendor; acquiring the content from a content provider; and inspecting the content to determine the rating based on predefined words, phrases, or Uniform Resource Locators (URLs) embedded within the content.

13. The method of claim 7, wherein acquiring the rating from the ratings vendor further includes receiving the list of rating for provided content distributed by a content provider, wherein the ratings is acquired from the list based on the content associated with the client request.

14. A system filter content, comprising:

clients that request content from content provider for policies; and a gateway proxy server that intercepts requests from the clients, automatic inspects cache for ratings associated with content that satisfies the requests, remotely contacts online rating vendors for a number of the ratings not in the cache over a public Internet communication network, and applies the policies against the ratings to determine whether the clients are to receive the content or be denied access to the content, the ratings are acquired from the online ratings vendor within lists over the Internet and a software module is acquired from the online ratings vendor to implement the rating on the clients, and when ratings are permissible for viewing the content, the content is further scanned for words or phrases that are not permissible and additional ratings are generated, and the ratings are content ratings for the content assigned form categories and sub-categories in response to criteria applied by the online ratings vendor to the content wherein the ratings in the list are in a Platform for Internet Content Selection (PICS) format; wherein automatically acquiring the rating further includes dynamically inspecting, by the ratings vendors, information in the content and dynamically producing the rating based on the dynamic inspection; and wherein enforcing the one or more policies further includes: determining that the rating acquired from the ratings vendor is deficient for purpose of enforcing the one or more policies; acquiring the content from a content provider; and acquiring from a rating supplier a modified rating for the rating based on the content that is supplied to the ratings supplier.

15. The system of claim 14, wherein the Gateway proxy server is a directory service.

16. The system of claim 14, wherein the gateway proxy server dynamically determines a number of the ratings in instances where some ratings are not in the cache and no adequately described by the ratings vendors by inspecting the content associated with the requests.

17. The system of claim 14, wherein the the gateway proxy server dynamically submits the content to a ratings supplier when a corresponding rating is not in the cache and not adequately described by the ratings vendors.

18. The system of claim 14, wherein the clients include World-Wide Web (WWW) browser applications that interface with the gateway proxy server over a network and the requests are Uniform Resource Locators (URLs) issued from the browser applications for the content providers, and wherein the URLs are intercepted by the proxy.

* * * * *

UNITED STATES PATENT AND TRADEMARK OFFICE
CERTIFICATE OF CORRECTION

| | |
|---|---|
| PATENT NO. | : 7,506,055 B2 |
| APPLICATION NO. | : 10/878782 |
| DATED | : March 17, 2009 |
| INVENTOR(S) | : McClain et al. |

It is certified that error appears in the above-identified patent and that said Letters Patent is hereby corrected as shown below:

In column 15, line 27, in Claim 1, delete "rating" and insert -- ratings --, therefor.

In column 15, line 32, in Claim 1, after "rating" insert -- is --.

In column 15, line 41, in Claim 1, delete "acquired" and insert -- acquire --, therefor.

In column 16, line 5, in Claim 6, delete "Location" and insert -- Locator --, therefor.

In column 16, line 7, in Claim 6, delete "URE" and insert -- URL --, therefor.

In column 16, line 8, in Claim 6, after "content" insert -- to --.

In column 16, line 23, in Claim 7, delete "not" and insert -- a --, therefor.

In column 16, lines 26-27, in Claim 7, after "content" delete "wherein the rating in the list is in a Platform for Internet Content Selection (PICS)".

In column 16, line 30, in Claim 7, before "the content" delete "to receive".

In column 16, line 56, in Claim 11, delete "rating" and insert -- ratings --, therefor.

In column 16, line 67, in Claim 13, delete "rating" and insert -- ratings --, therefor.

In column 17, line 3, in Claim 14, after "system" insert -- to --.

In column 17, line 7, in Claim 14, before "inspects" delete "automatic".

In column 17, line 9, in Claim 14, delete "rating" and insert -- ratings --, therefor.

In column 17, line 16, in Claim 14, delete "rating" and insert -- ratings --, therefor.

In column 17, line 21, in Claim 14, delete "form" and insert -- from --, therefor.

In column 17, lines 23-24, in Claim 14, after "content" delete "wherein the rating in the list is in a Platform for Internet Content Selection (PICS) format".

UNITED STATES PATENT AND TRADEMARK OFFICE
CERTIFICATE OF CORRECTION

PATENT NO. : 7,506,055 B2
APPLICATION NO. : 10/878782
DATED : March 17, 2009
INVENTOR(S) : McClain et al.

It is certified that error appears in the above-identified patent and that said Letters Patent is hereby corrected as shown below:

In column 18, line 9, in Claim 15, delete "Gateway" and insert -- gateway --, therefor.

In column 18, line 13, in Claim 16, delete "no" and insert -- not --, therefor.

In column 18, line 16, in Claim 17, before "gateway" delete "the".

Signed and Sealed this

Eleventh Day of August, 2009

David J. Kappos
*Director of the United States Patent and Trademark Office*